(12) United States Patent
Katz

(10) Patent No.: US 11,919,452 B2
(45) Date of Patent: Mar. 5, 2024

(54) SOUNDBOARD PANEL ASSEMBLY FOR VEHICLE SURFACES

(71) Applicant: Robert Katz, Montreal (CA)

(72) Inventor: Robert Katz, Montreal (CA)

( * ) Notice: Subject to any disclaimer, the term of this patent is extended or adjusted under 35 U.S.C. 154(b) by 224 days.

(21) Appl. No.: 17/424,931

(22) PCT Filed: Jan. 23, 2020

(86) PCT No.: PCT/CA2020/050074
§ 371 (c)(1),
(2) Date: Jul. 22, 2021

(87) PCT Pub. No.: WO2020/150822
PCT Pub. Date: Jul. 30, 2020

(65) Prior Publication Data
US 2022/0097620 A1    Mar. 31, 2022

Related U.S. Application Data

(60) Provisional application No. 62/918,233, filed on Jan. 23, 2019.

(51) Int. Cl.
*B60R 11/02*    (2006.01)
*B60R 13/02*    (2006.01)
*H04R 1/02*     (2006.01)

(52) U.S. Cl.
CPC .......... *B60R 11/0217* (2013.01); *B60R 13/02* (2013.01); *H04R 1/025* (2013.01); *H04R 2499/13* (2013.01)

(58) Field of Classification Search
CPC ....... B60L 1/0217; B60R 13/02; H04R 1/025; H04R 2499/13

USPC .......................................................... 381/86
See application file for complete search history.

(56) References Cited

U.S. PATENT DOCUMENTS

| | | |
|---|---|---|
| 6,332,029 B1 | 12/2001 | Azima et al. |
| 6,377,695 B1 | 4/2002 | Azima et al. |
| 6,522,760 B2 | 2/2003 | Azima et al. |
| 6,865,277 B2 | 3/2005 | Bank et al. |
| 2,904,154 A1 | 7/2005 | Azima et al. |
| 7,149,318 B2 | 12/2006 | Bank et al. |
| 7,158,647 B2 | 1/2007 | Azima et al. |
| 7,194,098 B2 | 3/2007 | Azima et al. |
| 8,208,655 B2 | 6/2012 | Kim et al. |
| 8,837,768 B2 | 9/2014 | Subat et al. |
| 9,525,943 B2 | 12/2016 | Donarski et al. |
| 9,621,994 B1 | 4/2017 | Bongiovi et al. |
| 9,774,936 B2 | 9/2017 | Fedyay et al. |
| 9,906,867 B2 | 2/2018 | Bongiovi et al. |
| 9,998,832 B2 | 6/2018 | Bongiovi et al. |
| 10,026,309 B1 | 7/2018 | Nepomuceno et al. |
| 10,141,903 B2 | 11/2018 | Goeppner |
| 2003/0124271 A1 | 7/2003 | Michael |

(Continued)

FOREIGN PATENT DOCUMENTS

| | | |
|---|---|---|
| CA | 2229998 C | 6/2007 |
| WO | 2013/131175 A1 | 12/2013 |

*Primary Examiner* — Sean H Nguyen
(74) *Attorney, Agent, or Firm* — Simpson & Simpson, PLLC

(57) ABSTRACT

A soundboard panel assembly for a vehicle, including a mounting structure, a soundboard panel connected to the mounting structure, and an inertial-type acoustic transducer connected to the soundboard panel.

15 Claims, 16 Drawing Sheets

(56) References Cited

U.S. PATENT DOCUMENTS

| | | |
|---|---|---|
| 2006/0159293 A1 | 7/2006 | Azima et al. |
| 2015/0086048 A1 | 3/2015 | Brown et al. |
| 2015/0128343 A1* | 5/2015 | Katz ................. H04R 1/025 |
| | | 5/279.1 |
| 2017/0193980 A1 | 7/2017 | Bongiovi et al. |

* cited by examiner

SOUNDBOARD PANEL ASSEMBLY FOR VEHICLE SURFACES

CROSS-REFERENCE TO RELATED APPLICATIONS

This application is the United States National Stage Application pursuant to 35 U.S.C. § 371 of International Patent Application No. PCT/CA2020/050074, filed on Jan. 23, 2020, which application claims the benefit of U.S. Provisional Patent Application No. 62/918,233, filed on Jan. 23, 2019, which applications are hereby incorporated by reference in their entireties.

FIELD

The present disclosure generally relates to vehicles and vehicle cabin surfaces, and more particularly, to a device for causing vehicles and vehicle cabin surfaces to act as improved audio systems including multi-utility panels incorporating audio speakers with improved or high fidelity using inertial-type acoustic transducers.

BACKGROUND

Vehicles, namely land based vehicles such as, but not limited to, automobiles, trucks, busses, and vans use onboard audio systems as well as multifunctional information and control displays. Traditional speakers within vehicles usually comprise a voice coil magnet circuit that when excited by an audio signal from an audio amplifier move a cone-type speaker diaphragm. The diaphragm then moves air, exciting it at audio frequencies within the cabin space. The air is excited local to the speaker cone and, based on the propagation polar of the speaker in question, will continue to excite air acoustically within the active propagation pattern of the speaker.

Often, numerous speakers are used to create even audio coverage of all acoustic bandwidths. This adds complexity to the vehicle's manufacturing and adds weight and labor. Despite the very complex audio systems used with multiple speakers, coverage can be compromised.

As conical-type speaker architectures exhibit a tendency to propagate high frequency content in a very narrow polar propagation pattern, as compared to a mid-range woofer for example, vehicle manufacturers will assemble a tweeter close to the side view mirrors in a vehicle, such that the speaker can be aimed at a listener's head to send high frequency content to the listener. The sound emanating from a woofer will cover a much wider propagation pattern and is typically mounted in the door panels of the vehicle, in the lower forward area. As the space within the cabin is constrained, to fill the cabin volume with the desired content speakers are required to be placed in other areas of the cabin adding cost, weight, labor, and complexity.

Additionally, the appearance of speaker grills detracts from the vehicle's design aesthetic. Industrial designers strive to simplify the look of the cabin interior and speaker grills required with standard cone-type speaker architectures as they detract from the aesthetic environment they are trying to create.

U.S. Pat. No. 6,377,695 (Azima et al.) discloses using the ceiling area, namely, a trim panel, as an acoustic radiating surface. The trim panel is fabricated by way of a sandwich of opposed skins and a resilient core which is by way of example a soft foam material. However, this arrangement is problematic because the soft foam material absorbs the mechanical vibration energy and impedes sound from propagating on the designated soundboard surface or skin. Similarly, the thinned portion or edge restricts the propagation of bending waves (i.e., acts to constrict the majority of the bending waves to the inscribed areas). Furthermore, Azima discloses the use of numerous acoustic radiators on the ceiling. However, the use of numerous radiators is not needed should the entire usable or available surface be made available for excitation, which unlike Azima, would not detract from the aesthetic appearance of the vehicle or add complexity to the vehicle's manufacturing thereby adding weight and labor costs.

Moreover, while transforming soundboards into speakers using acoustic exciters may be known, experimentation has shown that the complexities within the vehicle cabin environment does not allow such implementation to operate with a high or optimal fidelity.

Additionally, known acoustic exciters do not teach the control of soundboards wherein fidelity may be augmented automatically (or manually) via a digital sound processor.

Thus, there is a long-felt need for a vehicle wherein one or more surfaces found within the cabin environment interior surfaces, for example the ceiling pane, are transformed into planar acoustic wave radiating speakers. There is also a long-felt need to transform the surfaces into soundboards with increased fidelity and the ability to augment fidelity to create an optimal acoustic response.

SUMMARY

According to aspects illustrated herein, there is provided a soundboard panel assembly for a vehicle, comprising a mounting structure, a soundboard panel connected to the mounting structure, and an inertial-type acoustic transducer connected to the soundboard panel.

According to aspects illustrated herein, there is provided an audio system for a vehicle, comprising a mounting structure, a soundboard panel connected to the mounting structure, wherein the soundboard panel is a surface of the vehicle, an inertial-type acoustic transducer connected to the soundboard, and a digital sound processor connected to the inertial-type acoustic transducer, wherein the digital sound processor is operatively arranged to augment a fidelity of the audio system.

According to aspects illustrated herein, there is provided a method for augmenting the fidelity of a vehicle audio system including a soundboard panel, an inertial-type acoustic transducer connected to the soundboard panel, and a digital sound processor, the method comprising sending a signal to the inertial-type acoustic transducer to output a first sound through the soundboard panel, detecting, via the digital sound processor, the first sound, comparing, via the digital sound processor, the first sound to the signal, applying, via the digital sound processor, a distortion to the signal to create a distorted signal, and sending, via the digital sound processor, the distorted signal to the inertial-type acoustic transducer to output a second sound through the soundboard panel. In some embodiments, a first source signal (e.g., pink noise or an equivalent reference source signal) is sent through an amplifier to the inertial-type acoustic transducer connected to the soundboard panel. A microphone captures the first output signal from the inertial-type acoustic transducer and soundboard panel, namely, the first sound, and sends the first sound to the digital sound processor. The digital sound processor analyzes the signal against the original signal and distorts the original signal creating a distorted signal. The distorted signal may be amplified and is sent to the inertial-type acoustic transducer and soundboard panel. This method is utilized in order to augment the fidelity of the audio system, namely, by comparing an output sound to an input signal, and distorting that input signal to improve the overall quality of the output sound.

According to aspects illustrated herein, there is provided a vehicle and audio system, incorporating a multi-utility control and a display system as well as other soundboard surfaces within the cabin, and which audio system is capable of pre-distorting the source signal to provide an improved audio signal using various soundboard components within the vehicle, pedestrian alert systems for some vehicles, and to provide a means to cancel noise within the cabin of the vehicle.

An object of the present disclosure is to provide a means to cause materials forming the cabin interior, for example glass or other soundboard materials, to be transformed into acoustic radiating elements that can be automatically controlled in order to augment fidelity.

An object of the present disclosure is to create a means to have an inertial-type acoustic transducer acoustically excite a vehicle's door inner surface or surfaces without impeding the movement of the door's glass window when the glass window is lowered into the door center area.

An object of the present disclosure is to distort the acoustic signal driving an inertial-type acoustic transducer affixed to a vehicle's cabin surface such that the fidelity of the final output audio of the surface to which the inertial acoustic transducer is connected can be augmented.

An object of the present disclosure is to isolate direct mechanical vibration caused by an inertial-type acoustic transducer from any persons aboard the vehicle.

An object of the present disclosure is to propagate sound more evenly in sound pressure within the cabin space.

An object of the present disclosure is to propagate sound more evenly in frequency response within the cabin space.

An object of the present disclosure is to distort the acoustic signal driving an inertial-type acoustic transducer affixed to a vehicle's external surface such that the fidelity of the final output audio of the surface to which the inertial-type acoustic transducer is connected can be augmented.

An object of the present disclosure is to acoustically energize various materials within a vehicles cabin.

An object of the present disclosure is to create a hidden audio system within the vehicle.

An object of the present disclosure is to create a more efficient acoustic vehicle alerting system, or pedestrian alerting system.

An object of the present disclosure is to create a glass vehicle cabin speaker which also serves as an internal finishing panel in a vehicle and which speaker can also serve as a vehicle instrument or control panel displaying information from the back of the glass panel inward to the cabin, controllable by control knobs or capacitance touch.

An object of the present disclosure is to increase the ease with which a glass vehicle cabin speaker may be assembled and/or replaced in case of damage or maintenance.

An object of the present disclosure is to position vibratory soundboards away from passengers within the vehicle or in places where passengers would be unlikely to be in contact with the soundboard surfaces.

An object of the present disclosure is to create larger acoustic emitting surfaces within the vehicle cabin space so as to propagate sound more effectively into the cabin space.

An object of the present disclosure is to create soundboards of higher acoustic efficiency for higher decibel output.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
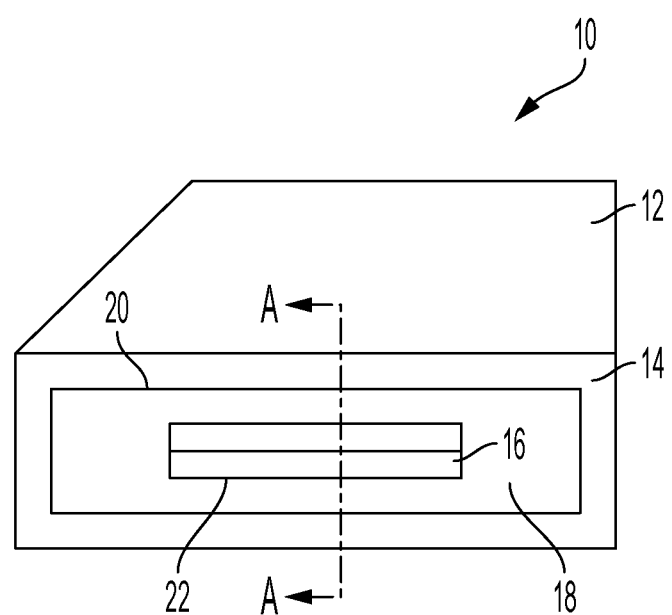
FIG. 1 is a side view of a vehicle door.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Distributed mode loudspeaker (DML) physics refers to the transformation of one or more surfaces found within the vehicle cabin environment into planar acoustic wave radiating speakers. The surfaces effectively become soundboards.

Fidelity refers to how accurately an output sound is in comparison to the source signal, or the sound quality. Put another way, fidelity refers to the correspondence of the output signal to the input signal. Thus, an output sound having a high fidelity is desired over an output sound having a low fidelity.

Augmented fidelity or augmenting fidelity refers to distorting a signal in order to improve or increase the fidelity of the output sound.

Figure 2:
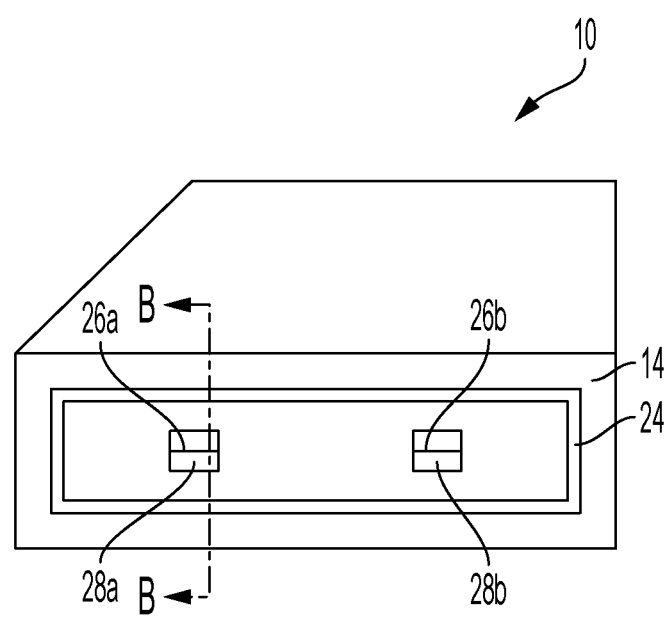
FIG. 2 is a side view of the vehicle door shown in FIG. 1 with some elements removed.

Adverting now to the figures, the following description should be read in view of FIGS. 1-2. The present disclosure relates to a vehicle cabin interior which surfaces are caused to emit an audio signal with increased fidelity. FIG. 1 illustrates automobile door 10, and more specifically, the interior facing surface of automobile door 10. Glass window 12 can be retracted downward largely into the center area of the door. The inner door panel is typically a layered construction with an innermost sheet metal structure, structure, inner door structure, or inner wall 14. Finishing panels usually are layered over the structural layer, namely structure 14. Armrest 16 is affixed to the inner door surface to provide driver or passenger comfort. Armrest 16 can be affixed to door 10 via any suitable means, for example, adhesives, rivets, screws, bolts, nails, pegs, soldering, welding, clamps, etc. Inner door soundboard panel 18 is connected to inner door structure 14. Inner door soundboard panel 18 is operatively arranged to function as an acoustic soundboard to propagate desired acoustic content into the vehicle's cabin space, as described in greater detail below. The aesthetic treatment of soundboard panel 18 may vary substantially as is known by those skilled in the art. Additional treatments can be layered over soundboard panel 18, and these finishing aesthetic treatments would be best chosen to be substantially acoustically transmissive (i.e., allow sound transmission therethrough or receive sound waves and subsequently transmit them). In some embodiments, soundboard panel 18 is connected to inner wall 14 at its perimeter 20.

Armrest 16 is connected to soundboard panel 18. In some embodiments, armrest 16 is connected to soundboard panel 18 at its perimeter 22. Soundboard panel 18 is operatively arranged to engage with armrest 16 to provide a clean visual appearance but also allow soundboard panel 18 to function unimpeded as a soundboard.

FIG. 2 shows door 10 with soundboard panel 18 and armrest 16 removed. In some embodiments, as previously discussed, inside door structure 14 may be formed at least partially of a piece of sheet metal. It should be appreciated that inside door structure 14 may comprise any suitable material such as, but not limited to, metal, glass, or carbon fiber reinforced material. Inside door structure 14 comprises receiving channel 24 which circumscribes soundboard panel 18. At least one tab, for example tab 26a and tab 26b, are bent substantially at 90 degrees from the vertical, creating a structural connection surface for armrest 16 to be affixed to. Tabs 26a and 26b are bent from inner door structure 14 and thus create openings 28a and 28b.

Figure 3:
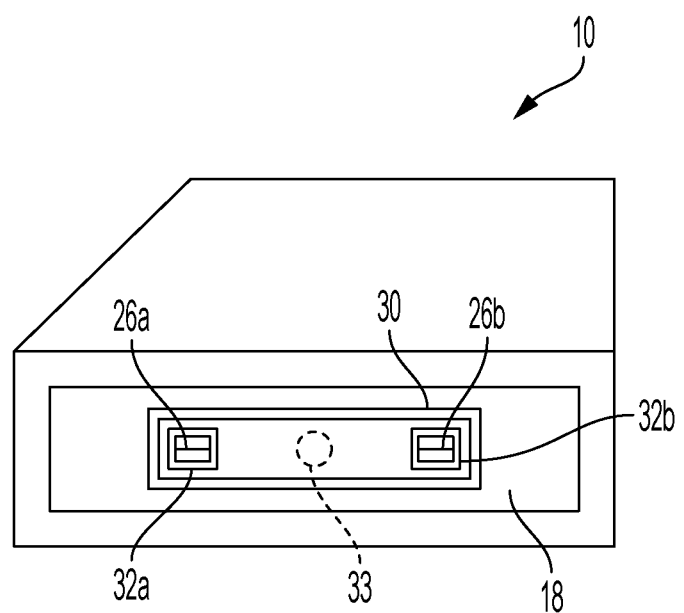
FIG. 3 is a side view of the vehicle door shown in FIG. 1 with some elements removed.

Now referring to FIG. 3, soundboard panel 18 is shown mounted on door 10. Receiving channel 30 receives armrest 16 substantially at its perimeter. Structural tabs 26a and 26b protrude through pass way slots 32a and 32b in soundboard panel 18. At least one inertial-type transducer is affixed adhesively or mechanically to soundboard panel 18 in the general position of circle 33. The positioning of the inertial-type transducer is not critical and can vary slightly but this general position is chosen to help hide the inertial-type transducer in the armrest.

Figure 4:
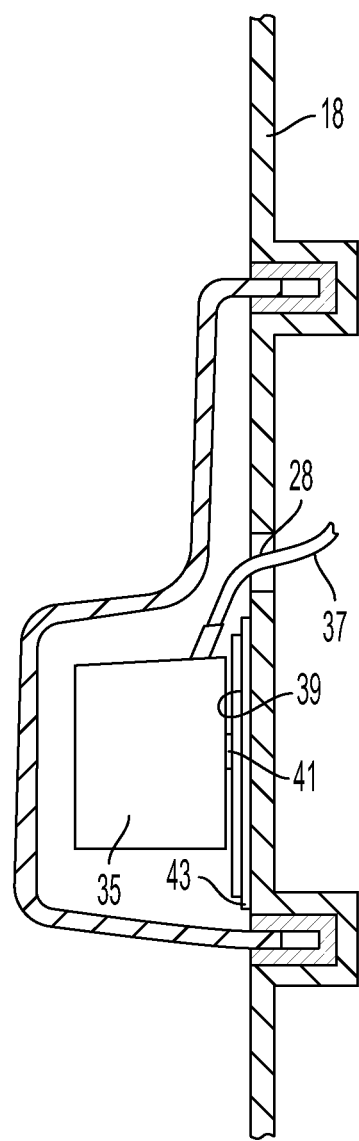
FIG. 4 is a cross-sectional view of the vehicle door taken generally along line A-A in FIG. 1.

FIG. 4 shows a cross-sectional view taken generally along line A-A in FIG. 1, which extends through inertial-type acoustic transducer 35 while affixed to soundboard panel 18 in or about position 33. In some embodiments, inertial-type acoustic transducer 35 is an inertial voice-type coil actuator as disclosed in U.S. Pat. No. 7,386,144 (Vincent et al.), which patent is incorporated in its entirety herein. However, it should be appreciated that any actuator/transducer suitable for converting a vehicle surface into an acoustic transmission device with high fidelity may be used. Inertial-type acoustic transducer 35 can be affixed adhesively via adhesive 43 or mechanically to soundboard panel 18. Wire 37 is the conduit through which an audio signal is sent to inertial-type acoustic transducer 35. In some embodiments, wire 37 extends through hole 28 arranged in soundboard panel 18. This renders the speaker portion of the audio system hidden within the cabin which is highly desirable.

In some embodiments, inertial-type acoustic transducer 35 can be mounted to soundboard panel 18 by way of a mounting means, for example, mounting disc 39. Mounting disc 39 includes threaded center stud 41, which is screwed into a threaded center receiving hole (not shown) in the base of the inertial-type acoustic transducer 35. An elastomeric "O" ring can act as a sealing interface between mounting disc 39 and the threaded receiving hole to impede water or other liquid or particulate entry.

Figure 5:
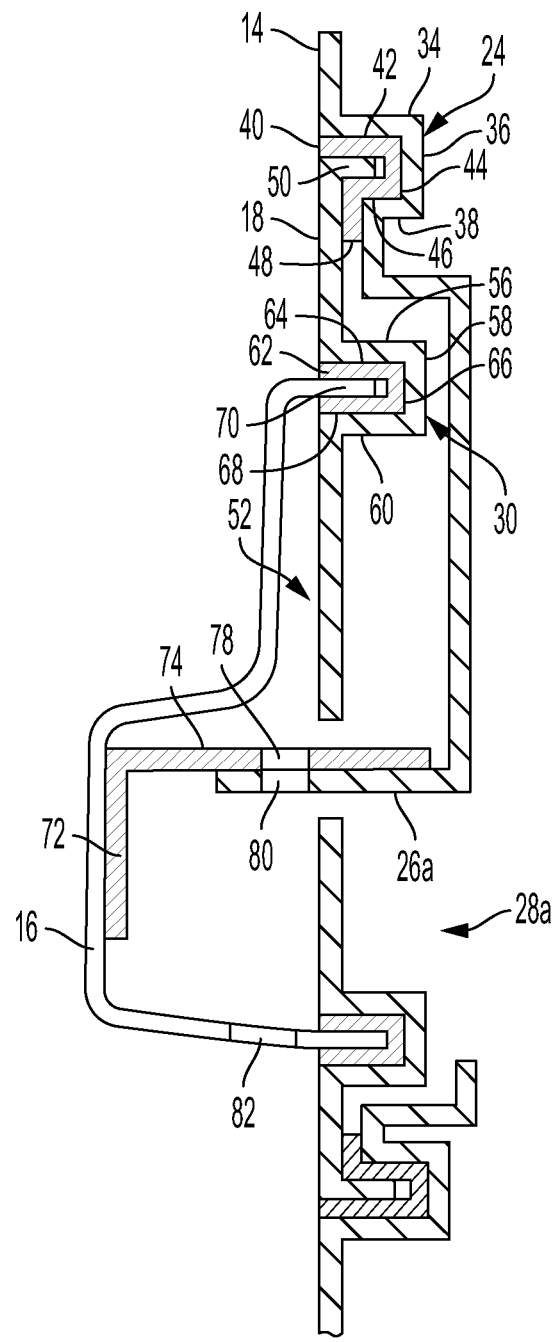
FIG. 5 is a cross-sectional view of the vehicle door taken generally along line B-B in FIG. 2.

FIG. 5 shows a cross-sectional view taken generally along line B-B in FIG. 2. Chanel 24 is generally configured in a "C" shape characterized by top surface 34, vertical surface 36, and lower surface 38. Elastomeric gasket component 40 is engaged with channel 24 and comprises top surface 42, vertical surface 44, lower surface 46, and second vertical element 48. In some embodiments, gasket component 40 comprises a material having a hardness such that it may absorb vibration and substantially vibrationally decouple soundboard panel 18 from door structure 14. It should be appreciated that gasket component 40 may comprise any other material, in substitution for or in addition to an elastomeric material, suitable to substantially vibrationally decouple the materials on either side of gasket component 40.

Inward facing flange 50 is arranged on a distal edge of soundboard panel 18 and engages the "C" shape of gasket component 40. Second vertical element 48 engages the vertical surface of soundboard panel 18 and is operatively arranged to spread and dissipate any inward compressive loads (i.e., applied to soundboard panel 18 from the distal edge of flange 50) from vertical surface 44.

Armrest 16 is separated from soundboard panel 18 by gap 52. This helps ensure the vibrations induced into soundboard panel 18 are not mechanically communicated to armrest 16.

Soundboard panel 18 comprises channel 30 operatively arranged to engage armrest 16. Similar to channel 24, channel 30 is "C" shaped and receives gasket component 62. Gasket component 62 is arranged to receive distal edge flange 70 of armrest 16. The same material vibrational decoupling principals described above with respect to gasket component 40 are employed with respect to gasket component 62. Channel 30 comprises upper wall 56, vertical wall 58, and lower wall 60. Elastomeric gasket component 62 is arranged to be engaged with channel 30 and comprises top surface 64, vertical surface 66, and lower surface 68.

In some embodiments, distal edge flange 70 is press fit into gasket component 62 and gasket component 62 is press fit into channel 30. Ideally the press fit assembly of these elements is permanent but can with some effort be disassembled. This same principal can be considered for the assembly of soundboard panel 18 to inner wall 14 (i.e., flange 50 is press fit into gasket component 40 and gasket component 40 is press fit into channel 24). However, it should be appreciated that soundboard panel 18 can be connected to inner door surface 14 (and armrest 16 can be connected to soundboard panel 18) via any means that suitably reduces vibration between elements.

As shown, in some embodiments armrest 16 comprises a "L" shaped structural bracket 72 affixed to armrest 16. It should be appreciated that armrest 16 can vary in design substantially. For example, in some embodiments armrest 16 may comprise a semi rigid foam with structural bracket 72 being embedded therein. In the embodiment shown, tab 26a comprises hole 80 which aligns with hole 78 of substantially horizontal member 74 of bracket 72 (i.e., holes 80 and 78 are coaxial). Any suitable means to secure horizontal member 74 and tab 26A may be used, for example, bolts, screws, nails, rivets, pins, solder, welding, adhesives, clamps, etc. In some embodiments, a simple bolt and a "T-Nut" type nut is used, with the nut affixed to hole 78 and the screw portion or bolt accessed from hole 82 on the underside of armrest 16 as it is not as noticeable if placed on the underside of armrest 16. Such an assembly causes armrest 16 to be structurally joined to the actual structural components of door 10 (i.e., door structure 14) and not soundboard panel 18.

Since tabs 26a and 26b hold armrest 16 structurally independently from soundboard panel 18, the inward force that armrest 16 applies to soundboard panel 18 can be metered. The fit of armrest 16 distal flange 70 into gasket 62 does not need to be very tight and this fit should be optimized to help avoid the transmittal of mechanical vibration induced on soundboard panel 18 to be passed to armrest 16.

Figure 6:
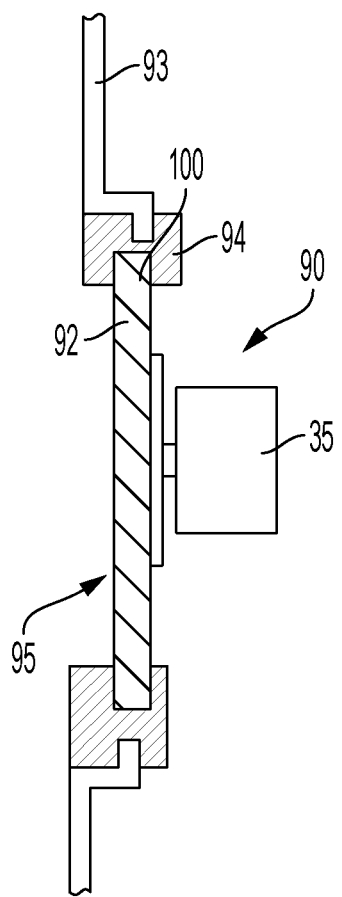
FIG. 6 is a partial cross-sectional view of the vehicle door.

Referring to FIG. 6, in areas of a vehicle door or any vehicle interior surface where the lowered glass does not interfere with the inside cavity of the door there is space for the inertial-type acoustic transducer to be placed on inside cavity 90 of door 10. Independent soundboard panel 92 is connected to inner finishing panel 93. For example, in some embodiments, finishing panel 93 comprises relief hole 95 and soundboard panel 92 is engaged therein. It should be appreciated that soundboard panel 92 is substantially planar and may comprise any suitable geometry. In some embodiments, soundboard panel 92 is connected to finishing panel 93 via suspension gasket 94. In some embodiments, gasket 94 comprises an "H" shape cross-sectional profile and end 100 of soundboard panel engages gasket 94. In some embodiments, independent soundboard panel 92 is connected to finishing panel 93 via adhesives. In some embodiments, independent soundboard panel 92 is connected to finishing panel 93 via mechanical means and a decoupling foam gasket to isolate soundboard panel 92 from inner finishing panel 93. It should be appreciated that soundboard panel 92 may be connected to finishing panel 93 via any suitable means. In some embodiments, soundboard panel 92 and its surrounding area(s) is covered with an acoustically transmissive material (e.g., a thin polymer layer or materials used for a headliner of a vehicle), creating a homogenous visual appearance.

It should be noted that some interior finishing panels can be used as soundboards themselves. In such embodiments, inertial acoustic transducer 35 is affixed to its inner wall. This would allow finishing panel 93 to produce sound with increased fidelity conditional to inertial-type acoustic transducer 35 receiving an acoustic signal that is distorted and with diminished fidelity, as will be described in greater detail below.

Materials for any soundboard panel 18 may vary greatly and include standard thermoplastic or thermoset polymer materials (e.g., thermoset foam) commonly forming inner finishing panels in vehicles and materials such as carbon composite, glass, aluminum honeycomb panels, or other types of material known in the art. As described above, a standard acoustic signal is sent to inertial-type acoustic transducer 35 via wire 37 (see FIG. 4). The sound emanating from soundboard panel 18 and/or independent soundboard panel (and/or inner finishing panel 93) will vary due to the resonant frequencies of the chosen material. For example, some variables that may affect the acoustic rendering of panels 18 and 92 are the material type, material thickness, material flexural modulus, panel geometry, etc. Choosing materials with poor acoustic qualities (i.e., resonant frequencies that adversely affect acoustic output according to the present disclosure) will result in the output of sound with less than optimal fidelity.

Figure 7A:
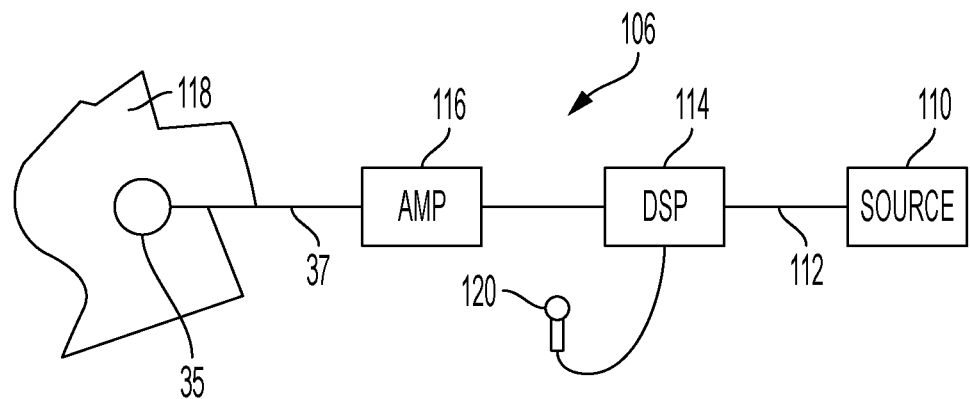
FIG. 7A is a schematic view of an audio distribution system.

Referring to FIG. 7A, audio system 106 includes content source signal 110, which is sent to amplifier digital sound processor 114 via wired or wireless means or communications fabric 112. The wireless means can be one of several technologies, such as but not limited to BLUETOOTH® wireless technology standard, WI-FI® wireless networking technologies, AUDINATE DANTE® audio technology, or other wireless technologies. Digital sound processor 114 is used to distort the incoming audio source signal and sends an intentionally distorted audio to soundboard panel 18, independent soundboard panel 92, or other stand-alone interior finishing panels within the vehicle, in order to increase fidelity. The distortion of the incoming audio source signal in order to increase fidelity is known herein as augmenting fidelity. A signal may be distorted using, for example, a notch filter.

Figure 7B:
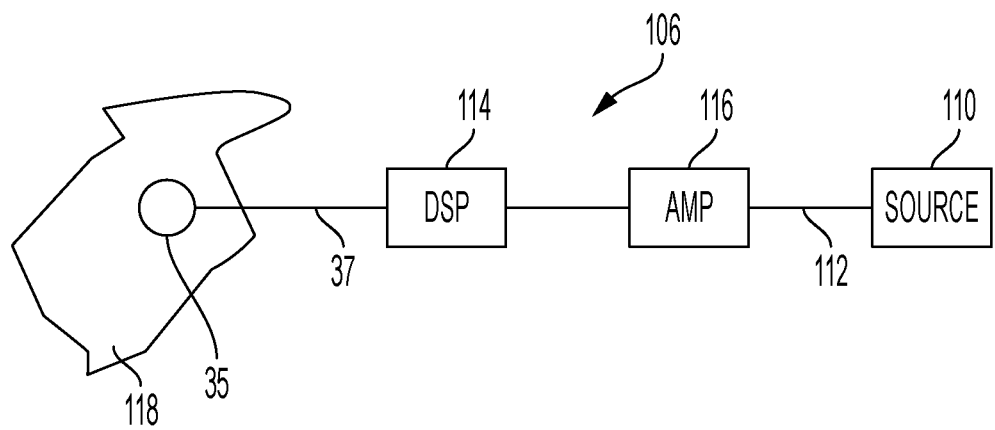
FIG. 7B is a schematic view of an audio distribution system.

The modified source signal is then sent to audio amplifier 116 which amplifies the content signal before sending it to inertial-type acoustic transducer 35 by way of wire 37. Alternatively, digital sound processor 114 can be used on the opposite side of amplifier 116 as shown in FIG. 7B, such that the signal is first amplified and then distorted prior to being sent to inertial-type acoustic transducer.

The augmenting of the fidelity played by audio system 106 is done by way of playing an audio signal through audio system 106 and measuring the frequency response using the original audio signal as a reference. The resonant characteristics, or acoustically non-responsive characteristics in some audio frequencies, of material 118 (e.g., of soundboard panel 18 or 92) to which inertial-type acoustic transducer 35 is attached may diminish the fidelity of the incoming audio signal, which originated as a source content signal. Modifying the original source signal by way of distorting it to compensate for the output sound having diminished fidelity will ultimately cause the varied surfaces to which inertial-type acoustic transducer 35 is connected to play with higher fidelity (i.e., augmenting fidelity).

Playing pink noise for example, through the entire audio system 106, measuring it, and then adjusting digital sound processor 114 to distort the incoming signal such that audio system 106 can play audio content with increased fidelity is a preferred method for augmenting fidelity. In some embodiments, digital sound processor 114 can be adjusted manually. In some embodiments, digital sound processor 114 can be adjusted via automatic equalization software, implemented in digital sound processor 114, for example. In such embodiments, microphone 120 is operatively arranged to send the distorted signal played by audio system 106 back to digital sound processor 114. Digital sound processor 114 then determines how to optimally distort source sound signal 110 such that inertial-type acoustic transducer 35 counters the dissonant sound reproduction with a dissonant source content signal to ultimately produce sound with increased or high fidelity. Put another way, digital sound processor 114 detects the output sound of audio system 106 via microphone 120 or other sensor and alters the distortion of content source signal 110.

The parameters of the distortion of the source signal can equally be saved to a non-volatile memory on audio amplifier 116 or digital sound processor 114. In serial production, these parameters can then be loaded onto the memory prior to installing amplifier 116 or digital sound processor 114 in the vehicle.

As the acoustic performance of is optimized, an inertial-type acoustic transducer specifically engineered to generate lower frequencies can be affixed to an appropriate soundboard within the vehicle, acting as a subwoofer generating sound at frequencies below 100 Hz, for example. Then an additional inertial-type acoustic transducer covering frequency bands above 100 Hz, for example, may be used to fill the cabin with a wider frequency response. A digital crossover may be applied to digital sound processor 114 uniting these complimentary frequency bandwidths to help improve acoustic response. Alternatively, a more conventional subwoofer may be used of a non-inertial-type design in conjunction with an inertial-type acoustic transducer to have the same effect of extending the range of total frequency response.

Since audio system 106 propagates sound with more even sound pressure levels over the cabin's volume of space due to its planar propagation wave form, with even frequency response due to bending wave physics energizing soundboard panels 18 and 92 or other internal materials that can be caused to act as a soundboard, audio system 106 has a propensity to be able to actively cancel certain frequencies within the cabin space more effectively than cone-type speaker architectures. In some embodiments, audio system 106 comprises processing software, implemented in digital sound processor 114, for example, operatively arranged to receive sound measured by microphone 120 in the cabin environment and applies an inverse wave to cancel the sound in the cabin in order to make a quieter cabin noise floor. In some embodiments, feed-forward adaptive active noise control hardware and software can be integrated into audio system 106 to effectively reduce cabin noise using the soundboard surfaces found throughout the vehicle.

In the case of land-based vehicles, electrically driven propulsion systems are becoming common. As these vehicles may be used in populated areas where pedestrian traffic is comingled with vehicle traffic, the pedestrians are not alerted of an approaching electrically driven vehicle due to the absence of sounds as electric propulsion emanates very little sound compared to internal combustion engine driven vehicles, which produce sounds that are more noticeable by pedestrians. Conventional cone-type speakers do not possess the functional attributes of a distributed mode loudspeaker or inertial-type acoustic transducer and can be compromised by way of dirt and moisture. Acoustically energizing a vehicle body panel via an inertial-type acoustic transducer will resolve the limitations of using a conventional-type speaker, as described in greater detail below.

An Acoustic Vehicle Alerting System (AVAS) or acoustic pedestrian warning signal means has become an important feature of electric land-based vehicles. Inertial-type acoustic transducer 35 may be applied adhesively or mechanically to numerous types of soundboard materials as demonstrated herein such as but not limited to, polymer-based soundboards, glass, composite materials, and others found on a vehicle. It should be noted that the soundboard geometries need not be flat but may exhibit more complex geometries, organic in form or rectilinear in their geometry. When considering an AVAS, inertial-type acoustic transducer 35 may be affixed to the front portion of the vehicle so as to emanate alerting sounds to alert pedestrians that the vehicle is approaching. As numerous materials can be acoustically excited by inertial-type acoustic transducer 35, vehicle parts arranged under the hood, bumpers, metal fenders, and other available vehicle parts can all function as soundboards when inertial-type acoustic transducer 35 is affixed thereto. The very wide polar propagation patterns of sounds generated by inertial-type acoustic transducer 35 affixed to the soundboard allow a wide coverage field so as to alert pedestrians to the left, right, or in front of the approaching vehicle. This is preferred over standard cone-type speakers which exhibit a much narrower propagation pattern and may be damaged by liquids or particulate. Additionally, the fact that a conventional-type speaker's sound rolls off logarithmically is another limitation of using conventional-type speakers in AVAS, since a pedestrian approaching from the side of the vehicle, or a quartering front angle would not hear the conventional speaker well. Pedestrians at further distances would not necessarily hear the oncoming vehicle well as the sound pressure level of a conventional standard cone-type speaker rolls off much sooner (logarithmically) than an inertial-type acoustic transducer affixed to one of the forward metal or polymer body panels of the vehicle, wherein the pedestrian would be in the near field of the inertial-type acoustic actuator propagation pattern.

Further, inertial-type acoustic transducer 35 can be manufactured to be fully sealed and carry an Ingress Protection (IPXX) rating (e.g., IP66 level) where liquids and particulate are impeded from entering inertial-type acoustic transducer 35 allowing it to be exposed to both liquids (e.g., water) and particulate (e.g., dust or dirt) which could be the case in an AVAS depending on where inertial-type acoustic transducer 35 is mounted. In some embodiments, inertial-type acoustic transducer 35 is completely sealed by way of adhesive assembly or other mechanical blocking means to impede water and particulate from entering the working internal area of inertial-type acoustic transducer 35, or the "O" ring seal as described with respect to FIG. 4, this making such embodiment employable for an AVAS. For example, the sealed inertial-type acoustic transducer 35 need not be housed and can be affixed to the interior of a bumper or car panel via adhesives.

Figure 8:
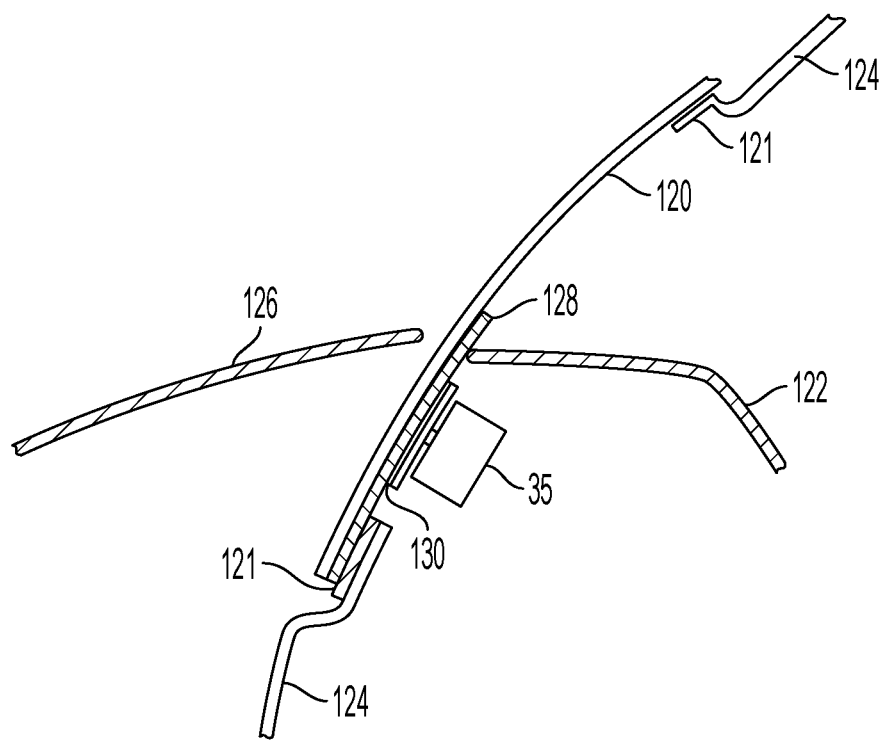
FIG. 8 is a partial cross-sectional view of a glass component of the vehicle.

Referring to FIG. 8, inertial-type acoustic transducer 35 can be affixed to glass surfaces of the vehicle and/or within the vehicle's interior via mechanical or adhesive means 130. Ideally, the windshield or rear window both of the vehicle, represented by element 120, would be used as a soundboard, but side glass window elements that are fixed or retractable can also be used. As bending wave physics are being used to acoustically energize the substrate, inertial-type acoustic transducer 35 does not have to be located in the center of soundboard panel 120, but can still be effective in the perimeter area of glass soundboard panel 120.

It is desirable to hide inertial-type acoustic transducer 35 from view. Inertial-type acoustic transducer 35 would be hidden from view by enclosing it under one of many of the vehicle's components, such as but not limited to, dashboard enclosure 122, which can also represent a rear glass hat table. It should be appreciated that element 122 may be an interior cover element applied to the side window of a bus, airplane, or other vehicle, for example, to hide inertial-type acoustic transducer 35 from view.

The perimeter of glass soundboard panel 120 is connected to one or more structural elements 124 which form the opening that glass soundboard panel 120 covers. In some embodiments, glass soundboard panel 120 is connected to structural elements 124 via adhesive 121. In some embodiments, silkscreened opaque or semi-opaque paint 128 can be applied proximate the perimeter of glass soundboard panel 120 further hide inertial-type acoustic transducer 35 from view. Other components 126 of the vehicle, for example, hood or trunk elements, may be used to hide inertial-type acoustic transducer 35.

As cited herein, numerous materials can effectively be utilized as soundboard materials. Glass or like materials offer a favorable acoustic response spectrum, and their use as soundboards in conjunction with inertial-type acoustic transducer 35 can be used in many formats within the cabin of a vehicle. Soundboard panels energized by inertial-type acoustic transducer 35 do typically function as an acoustic dipole wherein sound is propagated from both sides of the surface of the soundboard panel.

FIGS. 1-6 illustrate soundboard panels 18 and 92, which are arranged to be installed in an automobile door 10 or automobile interior panel. In such cases, the outer walls of the door or vehicle would act as a barrier to impede sound escaping into the space outside of the vehicle. This can be augmented with sound deadening substances placed in the internal cavity of the door or vehicle interior panel. This same principal demonstrates that applying a soundboard material into vehicle consoles and like enclosed areas on the vehicle will allow sound to be substantially contained in the enclosed area and propagated into the cabin space.

Figure 9:
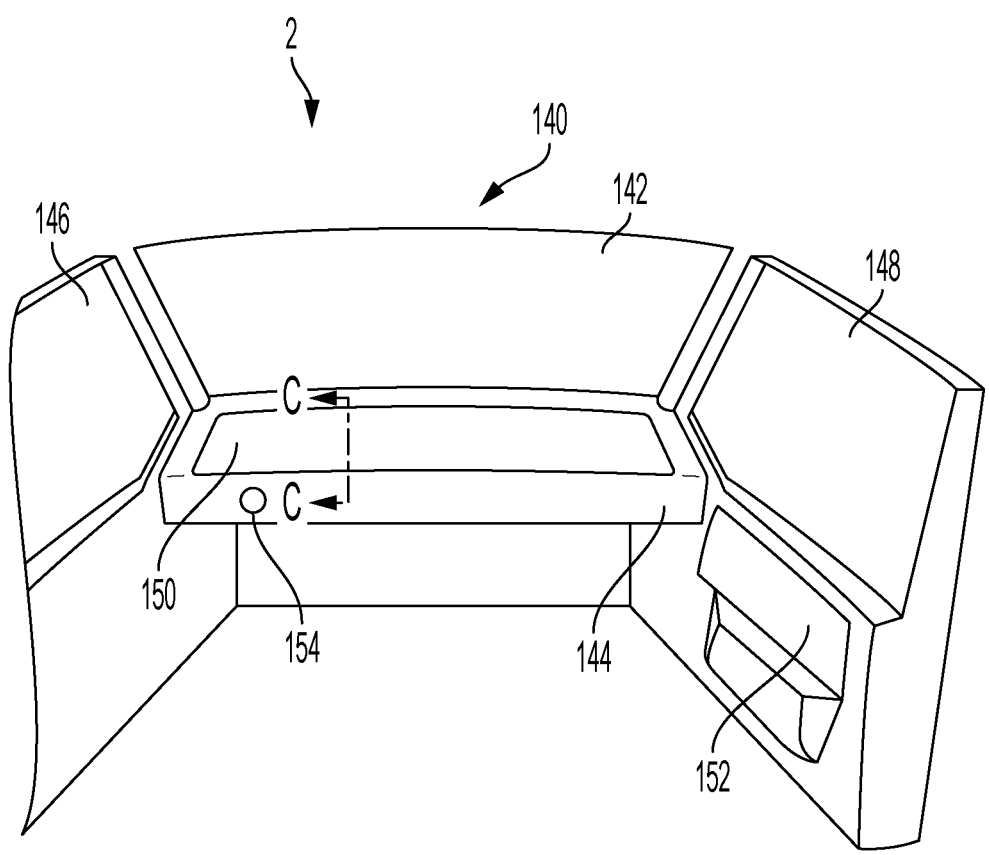
FIG. 9 is a partial perspective view of the vehicle cabin.
Figure 10:
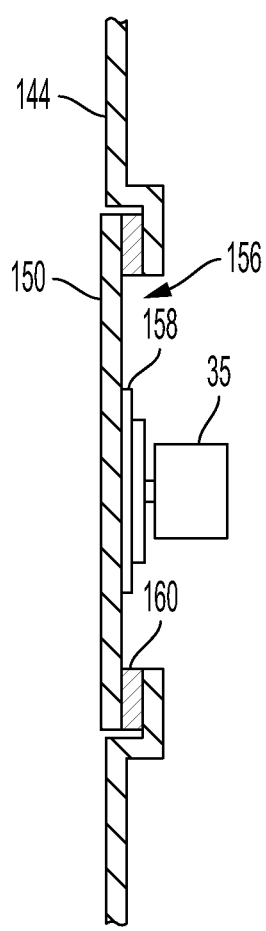
FIG. 10 is a cross-sectional view of the vehicle taken generally along line C-C in FIG. 9.

FIG. 9 shows a simplified perspective view of the front part of vehicle cabin 140 of vehicle 2. FIG. 10 shows a cross-sectional view of vehicle cabin 140 taken generally along line C-C in FIG. 9. The following descriptions should be read in view of FIGS. 9-10. It should be appreciated that while the interior of an automobile is shown, any other vehicle types may be used, for example, airplanes, busses, trains, etc.

Front control console 144 (e.g., the "dashboard") is an enclosed volume. Front control console 144 houses instruments used to understand numerous vehicle status parameters, such as but not limited to, navigation, speed, fuel reserves, engine parameters, heating, ventilation, and air conditioning (HVAC), entertainment, and others depending on the vehicle type. Opening 154 shows the area where a steering wheel (not shown) would be placed on front control console 144. Windshield 142, left door 146, and right door 148 form part of the cabin space of vehicle cabin 140.

Front control console 144 includes at least one glass panel 150. In some embodiments, at least one inertial-type acoustic actuator 35 is connected to the inside surface of glass panel 150, for example via adhesive 158. Inertial-type acoustic actuator 35 causes glass panel 150 to act as an audio soundboard from which desired audio content is propagated into vehicle cabin 140 using DML physics as described above with respect to all soundboard panels herein. Acting as a soundboard panel, glass panel 150 may be configured in other materials that function well as a soundboard, such as but not limited to, thermoplastic, wood, and metal.

Glass panel soundboard 150 is connected to console 144. In some embodiments, console 144 comprises hole 156 and glass panel 150 is operatively arranged to be connected to console 144 and cover hole 156. In some embodiments, adhesive 160 is applied generally to the full perimeter of glass panel 150 to secure glass panel 150 to console 144. Adhesive 160 further acts a mechanically decoupling agent between glass panel 150 and console 144, whereby vibrations, applied to glass panel 150 by inertial-type acoustic transducer 35, transmitted to console 144 are reduced.

Figure 11:
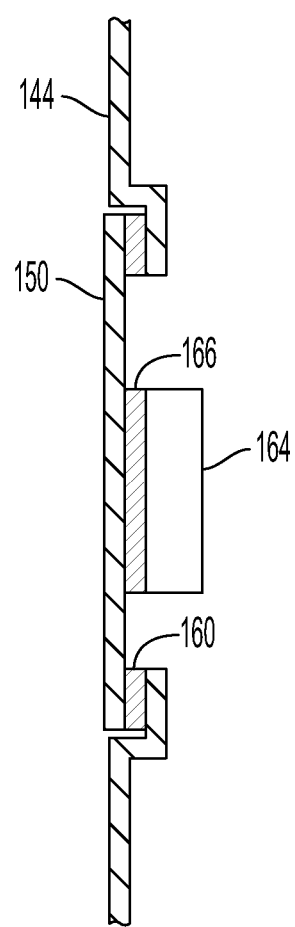
FIG. 11 is a cross-sectional view of the vehicle taken generally along line D-D in FIG. 9.

FIG. 11 shows a cross-sectional view of glass panel 150 taken generally along line D-D in FIG. 9, which is at a location other than where inertial-type acoustic transducer 35 is arranged. In some embodiments, at least one flat panel electronic information display 164 may be connected to the inside surface of glass panel 150, for example, via adhesive 166. Electronic information display 164 may be a light emitting diode (LED) matrix display, or may be an organic light emitting diode (OLED) display, or other suitable type of thin display that can be laminated to the inside surface of glass panel 150. The OLED display or like means has the added advantage of being flexible and therefore being applied to curved glass surfaces. Electronic information display 164 is sometimes referred to as a multi-function display (MFD) in some vehicle types.

Any one of the at least one electronic information displays 164 may further be controlled by multifunction control interfaces such as, but not limited to, an electronic encoder knob, or may be controlled by capacitance touch activation means known to those skilled in the art.

Inertial-type acoustic actuator 35 can also be applied to enclosed areas other than glass panel 150 such as, but not limited to, door 146 or door 148. For example, inertial-type acoustic actuator 35 may be applied or connected to glass panel 152 of door 148, which forms part of the inside surface of door 148. Inertial-type acoustic transducer 35 may vary in size (e.g., total height) in order to fit within areas having dimension limitations, for example, where there are height limitations such as a slim profile door. Inertial-type acoustic transducer 35 may also be applied to glass panel 152 in a location of vehicle 2 similar to that shown in FIG. 4.

Figure 12:
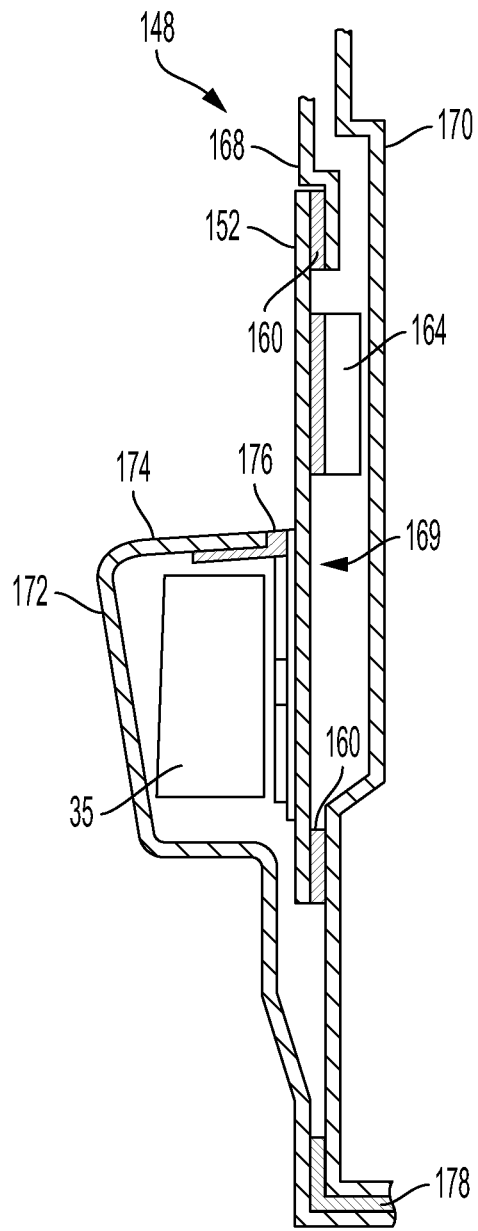
FIG. 12 is a partial cross-sectional view of the vehicle door.

Now referring to FIG. 12, door 148 comprises inner panel 168 having opening 169. Glass panel 152 is connected to inner door panel 168 and inner door structural surface 170, via any suitable means (e.g., adhesive 160). Armrest 172 comprises upper arm resting surface 174 and is mechanically or adhesively connected to inner door structural surface 170. All interfacing surfaces benefit from elastomeric mechanical decoupling elements 176 and 178, which are operatively arranged to isolate armrest 172 from vibrations created by inertial-type acoustic transducer 35. As has been described in great detail herein, inertial-type acoustic transducer 35 is connected to glass panel 152, for example, via adhesives. As shown, glass panel 152 extends past opening 169 such that inertial-type acoustic transducer 35 can be affixed thereto while being concealed.

Glass panel 152 is suspended by the adhesive 160, which mechanically decouples it and vibrationally isolates it from all associated surfaces. In some embodiments, adhesive 160 comprises a foam-type double sided tape, which is a high bond tape such as, but not limited to, an acrylic or polyurethane foam adhesive.

In all applications where glass is used as a soundboard element/panel in audio system 106, lights can be applied to the inside surface of the glass so as to create ambient lighting effects within the cabin. The glass panels can have numerous coatings applied to them to create aesthetic effects. One effect may be a lightly mirrored surface applied by way of vacuum metallization. In such embodiments, the display is not seen behind the glass surface if the lights are not illuminated due to the differences of ambient light on either side of the panel coupled with refraction; however, the display would be seen if the lights or display is illuminated behind the glass surface. This would have the effect of simplifying the cabin interior and creating novel interior panel surfaces that act as speakers with improved or high fidelity. With the addition of MFD's and lights, the glass panel speakers would present novel means to accomplish many yet unanticipated functions within the vehicle.

Figure 13:
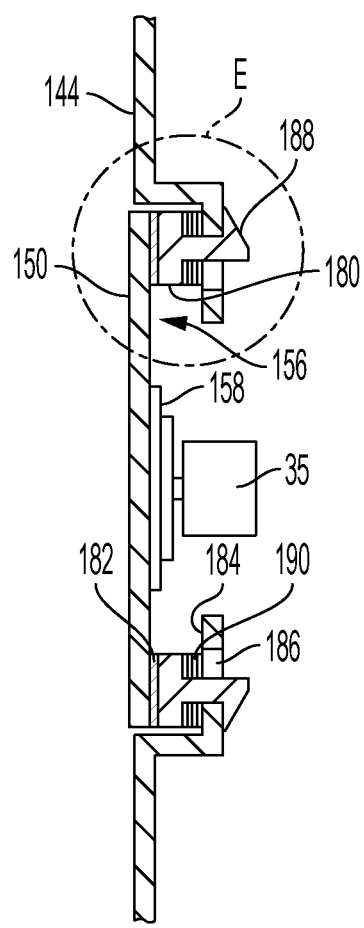
FIG. 13 is a partial cross-sectional view of the vehicle console.

Referring to FIG. 13, glass panel 150, glass panel 152 (not shown), or any other glass panel or finishing panel inside the vehicle interior can be affixed to front control console connected to 144. In some embodiments, and as shown, frame 180 is connected to glass panel 150 via adhesive 182 or another mechanical means. Abutment flange 184, which may be connected to front control console 144, comprises at least one hole 186 operatively arranged to receive one or more snap elements 188 of frame 180. In some embodiments, frame 180 covers the full perimeter of glass panel 150. In some embodiments, frame 180 at least partially covers the full perimeter of glass panel 150.

Foam or elastomeric interface 190 acts as an interface between abutment flange 184 and frame 180 so as to attenuate any vibration between the glass speaker panel, when excited by inertial-type acoustic transducer 35, and all surrounding and mating structures such as, but not limited to, console 144. It should be appreciated that hole 186 should be large enough to allow and accommodate unimpeded deflection of snap elements 188 during assembly of glass panel 150.

In some embodiments, frame 180 comprises a thermoplastic material and is integrally formed with molded snap elements 188. In some embodiments, frame 180 comprises metal such that frame 180 acts as a stiffening agent about the perimeter of glass panel 150. Stiffening the perimeter of glass panel 150 will help extend lower frequency performance of glass panel 150 when excited by inertial-type acoustic transducer 35. Snap elements 188 may comprise metal, thermoplastic, or any other suitable material.

Figure 14:
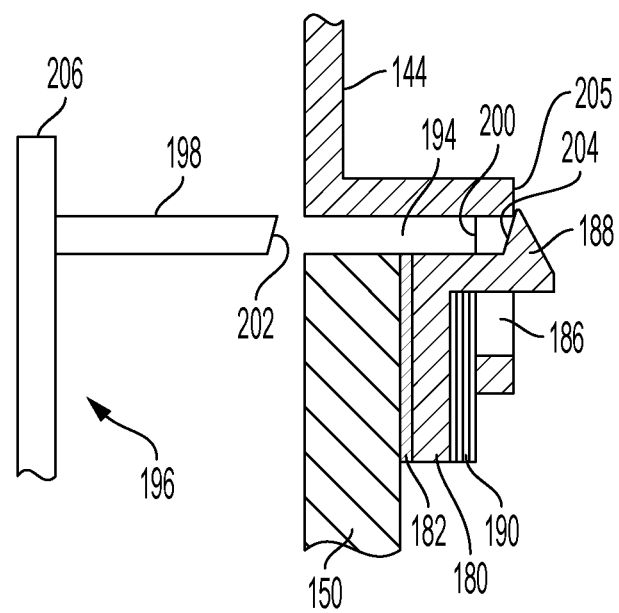
FIG. 14 is a detailed view of the vehicle console taken generally at detail E in FIG. 13.

FIG. 14 is a detail view, taken generally along detail E in FIG. 13, showing an example embodiment of the present disclosure in which glass panel 150 can be easily removed and/or replaced in the case of damage. Specifically, it is desired that snap elements 188 be released from their assembled position. In some embodiments, gaps 194 allows insertion of tool 196, which includes one or more releasing pins 198. Specifically, each of releasing pins 198 comprise tip 202 operatively arranged to engage gaps 194 and access holes 200. Access holes 200 are arranged proximate the center position of all snap elements 188. Applying force to plate 206 of tool 196 causes tips 202 to engage snap surfaces 204 and simultaneously release all snap elements 188. In some embodiments, tip 202 comprises an angle or beveled surface and surface 204 comprises an angle or beveled surface. In some embodiments, the angled of the surface of tip 202 is equal to the angle of surface 204. When tip 202 engages surface 204, the angled surfaces would produce a downward deflection of snap element 188 towards the center of glass panel 150, thus releasing it from surface 205. Other like means of releasing snap element 188 known to those skilled in the art may equally be employed. After release of all snaps 188, glass panel 150 can be removed (e.g., a suction cup can then be affixed to proximate the center of glass panel 150 to retract glass panel 150 while snap elements 188 are deflected into a non-retention geometry). In some embodiments, plate 206 comprises a hole in the middle to allow the suction cup to pass therethrough. In some embodiments, plate 206 can be sized large enough to hold all release pins 198 as is necessary.

Glass panel 150 may comprise various types of glass, for example, tempered safety glass. Glass panel 150 may also be tinted in various colors, or any surface thereof may be painted or finished with a variety of surface finishing materials including, but not limited to, vacuum metallization.

It should be appreciated that the diameter of each access hole 200 is slightly greater than the diameter of releasing pin 198 but substantially less than the mating surface of front control console 144 and snap surface 204. In some embodiments, releasing pin 198 can be configured in a rectangular shape still keeping the above-described mating surfaces larger than access hole 200.

Figure 15:
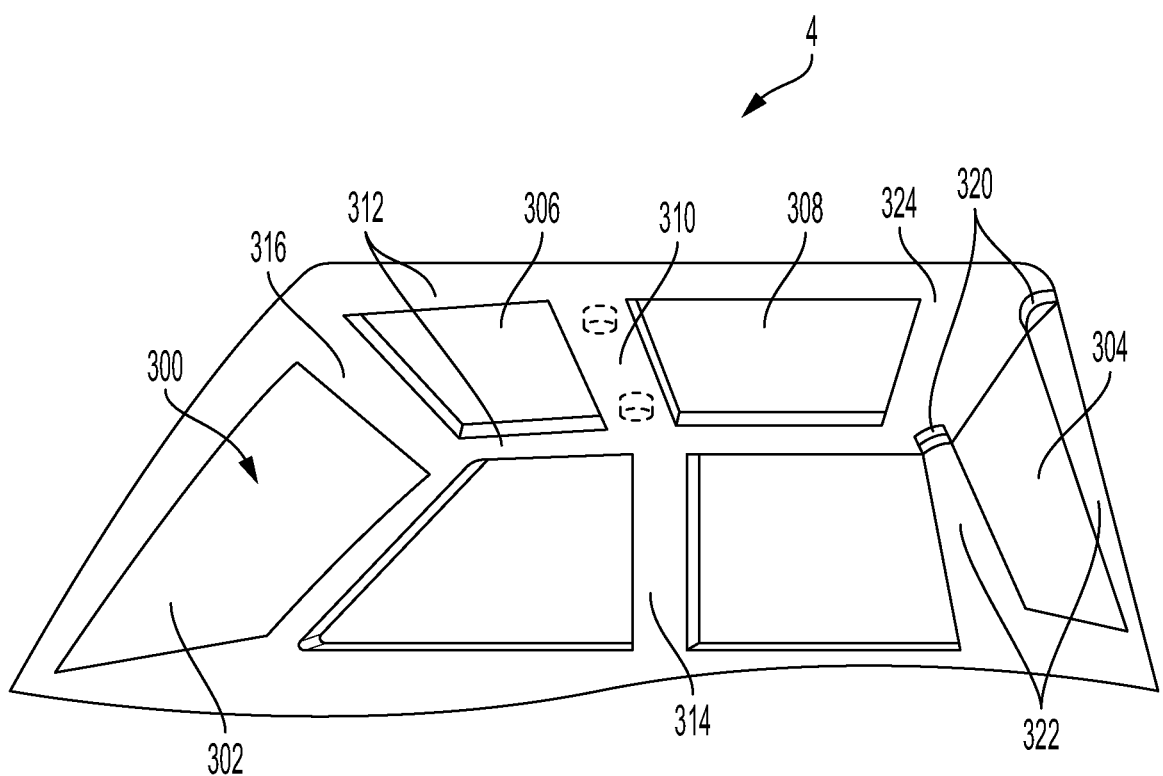
FIG. 15 is a partial perspective view of the vehicle interior.

Referring to FIG. 15, standard vehicle interior 300 of vehicle 4 is shown. Vehicle interior 300 comprises windshield 302 and rear window 304. Car seats and doors are not shown in order to simplify the figure. Often vehicles are being equipped with roofs having a large percentage of their overall surface being constructed of glass. Vehicle interior 300 comprises forward sunroof 306 and rear sunroof 308 arranged adjacent to each other. In some embodiments, forward sunroof 306 can be opened upward and rearward over rear sunroof 308. Beam 310 is arranged between forward sunroof 306 and rear sunroof 308 and forms part of the headliner. The headliner may comprise a singular large piece of material or a number of parts that are assembled together. In some embodiments, beam 310 comprises dimensions suitable to house one or more inertial-type acoustic transducers 35 (locations shown in hidden lines).

The inertial-type acoustic transducer may be connected to rear glass sunroof 308, for example, or may be connected or otherwise affixed to the headliner material forming beam 310. In some embodiments, headliner material is a light and stiff material similar to that as described hereinabove.

In some embodiments, at least one inertial-type transducer 35 (not shown) may be connected to side headliner 312. In some embodiments, at least one inertial-type transducer 35 (not shown) may be connected to front headliner 316. In some embodiments, at least one inertial-type transducer 35 (not shown) may be connected to pillar 314. In such embodiments, pillar 314 may be constructed as a structural element in the vehicle chassis and can be covered with the same material as the headliner offering good acoustic properties for the purposes intended. A relief hole in the structure within the pillar 314 would allow the inertial-type acoustic transducer 35 to be housed therein and be arranged in acoustic contact with the headliner material. This principal may be replicated at numerous other places in the vehicle including but not limited to the headliner elements shown in FIG. 15.

In some embodiments, at least one inertial-type acoustic transducer 35 may be arranged at the intersection between pillar 314, beam 310, and side headliner 312. In some embodiments, at least one inertial-type acoustic transducer 35 may be arranged at the intersections of rear pillar 322 and rear headliner 324, for example, at corners 320. As the headliner material may be molded, it can be shaped to formally integrate the interior headliner surface around the inertial-type acoustic transducer anywhere on the headliner.

The headliner areas as described may be formed primarily as one singular component, or areas may be coalesced to form a larger singular part. Bending wave physics would have the acoustically energized headliner cover a larger surface if the areas of the headliner were formed of a single molded part. To save on manufacturing cost, numerous parts could be made and then assembled. Vibrational acoustics bridging could occur numerous ways to give the effect of the multiple contiguous parts to function as a singular part. Adhesive joining would be one way of causing this to happen.

Figure 16A:
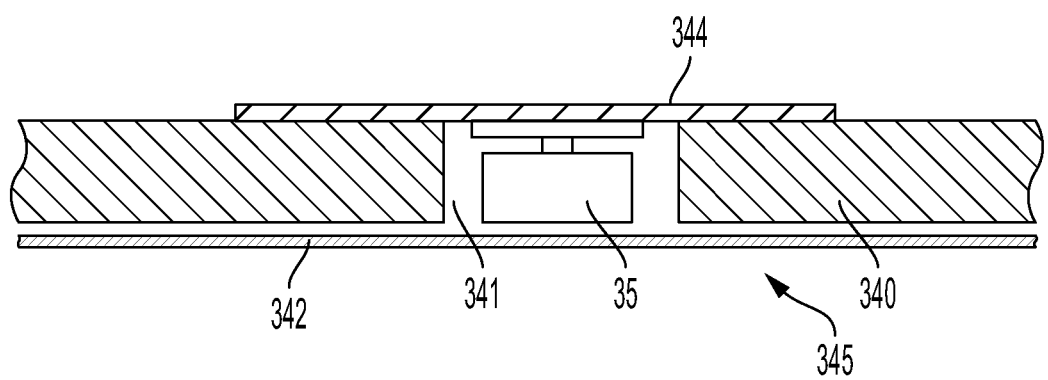
FIG. 16A is a partial cross-sectional view of the vehicle ceiling headliner; and, FIG. 16B is a partial section view of the vehicle ceiling headliner.
Figure 16B:
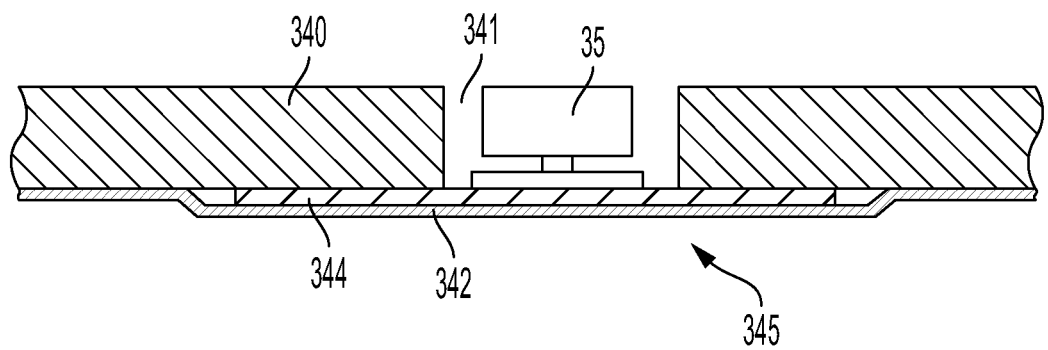

Referring to FIGS. 16A-B, in some embodiments inertial-type acoustic transducer 35 can be installed in hole 341 within the thickness of headliner structural material 340 via any suitable means (e.g., adhesives or other mechanical means). In some embodiments, inertial-type acoustic transducer 35 can be installed above or below headliner structural material 340 (this embodiment is not shown). Headliner structural material 340 may be an insulating foam-type material such as STYROFOAM® closed-cell extruded polystyrene foam, structural foam, or other moldable materials. Because headliner structural material 340 may be fragile, in some embodiments interfacing plate 344 may be used to connect inertial-type acoustic actuator 35 to headliner structural material 340. Interfacing plate 344 may be flat and/or shaped to provide a larger surface area to connect inertial-type acoustic actuator 35 to headliner structural material 340. Interfacing plate 344 is also arranged to protect the bonded interface without damaging headliner structural material 340. In some embodiments, interfacing plate 344 comprises a high flexural modulus and may be thin so as to not substantially add to the stack up height of the headliner in cross section.

Headliner structural material 340 should also have a high flexural modulus so as to transfer mechanical vibrational energy efficiently without absorption. Any softer material forming any part of the headliner or interfacing plate 344 such as a soft foam would absorb vibrational acoustic energy and be detrimental to achieving the objectives of creating an audio system. These elements would also be able to be assembled adhesively or via other suitable mechanical means. In some embodiments, a finishing material, such as an acoustically permeable fabric or woven fiber material 342 may be laminated to the cabin facing surfaces of the headliner, as shown in FIGS. 16A-B.

If headliner structural material 340 is homogeneous and has a high stiffness to weight ratio, then the mounting of inertial-type acoustic transducer 35 may be as shown in FIG. 16A. The arrangement as shown in FIG. 16B would allow a slightly elevated efficiency of propagating reproduced audio into cabin interior 345 wherein the surface of the headliner or ceiling insulating foam component, namely, headliner structural material 340, is energized on the surface facing cabin interior 345 and facing the listener. Small losses in fidelity by way of absorption or changes to the energy traveling through headliner structural material 340 would be decreased and the bending waves would be emitting sound toward the listener directly. If the stiffness of headliner structural material 340 is not optimized, then exciting it from the top surface as shown in FIG. 16A would risk an energy loss or modification through headliner structural material 340.

It should be noted that many surfaces within the vehicle (e.g., in the ceiling area) may be used to propagate sound as described above.

Vehicle cabin noise control would benefit from the noise control signal being evenly propagated throughout the cabin volume. Activating the various above identified ceiling area components and propagation through DML, physics would more effectively deliver the desired acoustic signal, whether for active noise reduction and cancellation (inverse signal removal of sound), or the addition of a sound masking signal.

In view of the fact that inertial-type acoustic transducer 35 would send bending waves (i.e., DML physics) throughout the soundboard surface to which it is attached to, inertial-type acoustic transducer 35 could be arranged in corners 320 of the headliner material acting as a soundboard, as shown in FIG. 15.

It should be appreciated that the soundboard panels described herein should preferably comprise light and stiff materials, as those materials work best as soundboards when used with inertia type acoustic exciters; however, other materials can be used. It should also be appreciated that the headliners can be molded in various materials. In some embodiments, for the purposes of good acoustic propagation through DML physics, materials such as structural foam with a high modulus and low density (lightweight) are desired. In some embodiments, STYROFOAM® closed-cell extruded polystyrene foam can be used as an example where stiffness and lightweight combine to make a desirable headliner. In some embodiments, structural foam materials which exhibit fireproof or flame-retardant characteristics requisite for vehicle designs and may be used. In some embodiments, the materials can be laminated to a fabric-type material finishing the outer surfaces. In some embodiments, organic geometry may be used. It should be appreciated that one benefit of DML physics over other acoustic options is that, with respect to DML physics, sound can be propagated over soft or easily transitioned organic forms to allow the entire or almost the entire headliner (or soundbar panel) to be energized acoustically. Thus, in some embodiments, the ceiling coverings can be molded to house various components including speakers (e.g., inertial-type acoustic transducers) to excite the headliner materials acoustically.

The scope of the present disclosure should not be limited to any one type of vehicle, but instead apply to all panel surfaces including glass found in the cabin space of various vehicle types including, but not limited to, land-based vehicles, aircraft, or marine based vehicles. Where applicable, the outer surfaces of a vehicle, which are essentially panel structures, can equally be transformed into acoustic radiators with high fidelity. For example, a truck's side panels, or the external surfaces of a marine vessel's deck area may be used. The illustrative preferred embodiments herein cited can equally be used in objects other than vehicles, such as control rooms and other apparatuses requiring speakers known to those skilled in the art, and the scope of the present disclosure should not be limited to vehicle cabins solely.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A soundboard panel assembly for a vehicle, comprising:
    a mounting structure;
    a soundboard panel connected to the mounting structure; and,
    an inertial-type acoustic transducer connected to the soundboard panel, wherein the soundboard panel is connected to a structure of the vehicle via one or more gaskets.

2. The soundboard panel assembly as recited in claim 1, wherein the soundboard panel is a surface of the vehicle.

3. The soundboard panel assembly as recited in claim 2, wherein the surface of the vehicle is one of a door structure, an inner finishing panel, a glass panel, a headliner, a beam, a pillar, a bumper, a fender, and an exterior panel of the vehicle.

4. The soundboard panel assembly as recited in claim 3, wherein the surface of the vehicle is a headliner and the inertial-type acoustic transducer is arranged at least partially within a hole in the headliner.

5. The soundboard panel assembly as recited in claim 1, wherein:
    the structure comprises a channel; and,
    the soundboard panel comprises a flange engaged with the channel.

6. The soundboard panel assembly as recited in claim 1, wherein the inertial-type acoustic transducer is connected to the soundboard panel via an adhesive.

7. The soundboard panel assembly as recited in claim 1, wherein the soundboard panel is connected to the mounting structure via one or more snap elements.

8. The soundboard panel assembly as recited in claim 1, wherein:
    the mounting structure is a door structure of the vehicle, the door structure being arranged on a first axial side of the soundboard panel; and,
    an armrest of the vehicle is operatively arranged to enclose the inertial-type acoustic transducer, the armrest being arranged on a second axial side of the soundboard panel, opposite the first axial side.

9. The soundboard panel assembly as recited in claim 1, wherein:
    the mounting structure is a door structure of the vehicle; and,
    the inertial-type acoustic transducer is arranged on a surface of the soundboard panel that is furthest from a cabin interior of the vehicle.

10. The soundboard panel assembly as recited in claim 1, further comprising a digital sound processor connected to the inertial-type acoustic transducer, the digital sound processor operatively arranged to distort a content source signal.

11. The soundboard panel assembly as recited in claim 1, further comprising an audio amplifier connected to the inertial-type acoustic transducer.

12. An audio system for a vehicle, comprising:
    a mounting structure;
    a soundboard panel connected to the mounting structure, wherein the soundboard panel is a surface of the vehicle;
    an inertial-type acoustic transducer connected to the soundboard; and,
    a digital sound processor connected to the inertial-type acoustic transducer, wherein the digital sound processor is operatively arranged to augment a fidelity of the audio system, wherein the soundboard panel is connected to the mounting structure via one or more gaskets.

13. The audio system as recited in claim 12, wherein the surface of the vehicle is a headliner and the inertial-type acoustic transducer is at least partially embedded in the headliner.

14. The audio system as recited in claim 12, wherein:
    the mounting structure is a door structure of the vehicle; and,
    the inertial-type acoustic transducer is enclosed on the door structure by an armrest.

15. The audio system as recited in claim 12, wherein the inertial-type acoustic transducer is enclosed on the soundboard panel.

\* \* \* \* \*